United States Patent
Natarajan et al.

(10) Patent No.: US 12,526,625 B2
(45) Date of Patent: Jan. 13, 2026

(54) ENRICHED A-KID FOR AKMA AUTHENTICATION SERVICE

(71) Applicant: Nokia Technologies Oy, Espoo (FI)

(72) Inventors: Rajesh Babu Natarajan, Bangalore (IN); Saurabh Khare, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 352 days.

(21) Appl. No.: 18/190,910

(22) Filed: Mar. 27, 2023

(65) Prior Publication Data
US 2023/0319561 A1 Oct. 5, 2023

(30) Foreign Application Priority Data
Mar. 29, 2022 (IN) .............................. 202241018484

(51) Int. Cl.
*H04W 12/06* (2021.01)
*H04W 12/041* (2021.01)
*H04W 12/0433* (2021.01)

(52) U.S. Cl.
CPC ......... *H04W 12/06* (2013.01); *H04W 12/041* (2021.01); *H04W 12/0433* (2021.01)

(58) Field of Classification Search
CPC ............... H04W 12/06; H04W 12/041; H04W 12/0433; H04W 12/40; H04W 12/069; H04L 67/141; H04L 69/06; H04L 63/0892; H04L 9/0861
See application file for complete search history.

(56) References Cited

U.S. PATENT DOCUMENTS

2023/0136693 A1* 5/2023 Kunz .................... H04W 12/04
713/171

FOREIGN PATENT DOCUMENTS

WO WO-2023016160 A1 * 2/2023 ........ H04W 12/0433
WO WO-2023152054 A1 * 8/2023 ............ H04W 12/04

OTHER PUBLICATIONS

5G; Authentication and Key Management for Applications (AKMA) based on 3GPP credentials in the 5G System (5GS) (3GPP TS 33.535 version 16.0.0 Release 16) (Year: 2020).*
Office action received for corresponding European Patent Application No. 23163047.6, dated Nov. 11, 2024, 6 pages.
"3rd Generation Partnership Project; Technical Specification Group Core Network and Terminals; 5G System; Network Exposure Function Northbound APIs; Stage 3 (Release 17)", 3GPP TS 29.522, V17.5.0, Mar. 2022, pp. 1-385.
Dekok, "The Network Access Identifier", RFC 7542, Internet Engineering Task Force (IETF), May 2015, pp. 1-30.
(Continued)

*Primary Examiner* — Joshua L Schwartz
(74) *Attorney, Agent, or Firm* — Duft & Bornsen, PC

(57) ABSTRACT

Systems, methods, and software of performing an Authentication and Key Management for Applications (AKMA) authentication service. In one embodiment, an AKMA element (1200) handles an enriched AKMA Key Identifier (A-KID) (800) having an identifier format with a username (802) and a realm (804) separated by an @-symbol (806). The username includes a Routing Indicator (RID) (812), an AKMA Temporary UE Identifier (A-TID) (814), and at least one supplemental character (810) that distinguishes the RID from the A-TID in the username The AKMA element performs a function of the AKMA authentication service based on the enriched A-KID.

9 Claims, 15 Drawing Sheets

(56) References Cited

OTHER PUBLICATIONS

"3rd Generation Partnership Project; Technical Specification Group Core Network and Terminals; Numbering, addressing and identification; (Release 17)", 3GPP TS 23.003, V17.5.0, Mar. 2022, pp. 1-146.

"AKID encoding clarification", 3GPP TSG-CT WG3 Meeting #121-e, C3-222472, Nokia, Apr. 6-12, 2022, 5 pages.

"3rd Generation Partnership Project; Technical Specification Group Services and System Aspects; Authentication and Key Management for Applications (AKMA) based on 3GPP credentials in the 5G System (5GS) (Release 17)", 3GPP TS 33.535, V17.5.0, Mar. 2022, 25 pages.

"3rd Generation Partnership Project; Technical Specification Group Services and System Aspects; System architecture for the 5G System (5GS); Stage 2 (Release 17)", 3GPP TS 23.501, V17.4.0, Mar. 2022, pp. 1-567.

"3rd Generation Partnership Project; Technical Specification Group Services and System Aspects; Security architecture and procedures for 5G system (Release 17)", 3GPP TS 33.501, V17.5.0, Mar. 2022, pp. 1-293.

Office action received for corresponding Brazilian Patent Application No. BR102023005687-3, dated Apr. 28, 2023, 2 pages of office action and no page of translation available.

Extended European Search Report received for corresponding European Patent Application No. 23163047.6, dated Jul. 28, 2023, 10 pages.

"PCR : AKMA Temporary UE Identifier", 3GPP TSG-SA3 Meeting #98Bis-e, S3-200770, Agenda: 2.4, Qualcomm Incorporated, Apr. 14-17, 2020, 2 pages.

"SUCI definition for 5G-RG and FN-RG", 3GPP TSG-CT WG4 Meeting #96, C4-200533, Nokia, Feb. 24-28, 2020, 7 pages.

"Type-length-value", Wikipedia, Retrieved on Sep. 3, 2023, Webpage available at : https://en.wikipedia.org/w/index.php?title=Type-length-value&oldid=869210452.

Office Action received for corresponding Japanese Patent Application No. 2023-048283, dated Feb. 13, 2024, 4 pages of office action and 4 pages of office action translation available.

Tentative Rejection received for corresponding Taiwan Patent Application No. 112111817, dated Feb. 15, 2024, 11 pages of office action and no page of translation available.

Office action received for corresponding European Patent Application No. 23163047.6, dated May 24, 2024, 8 pages.

* cited by examiner

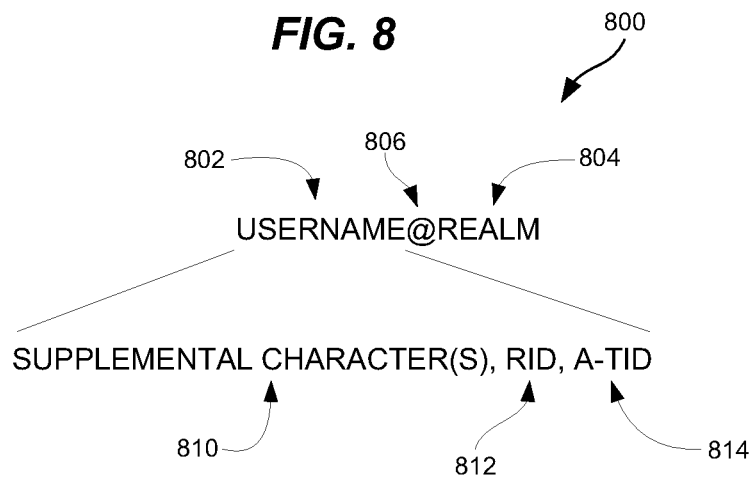
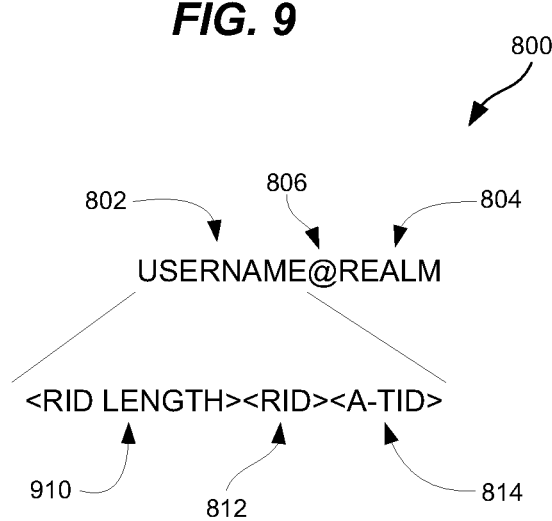

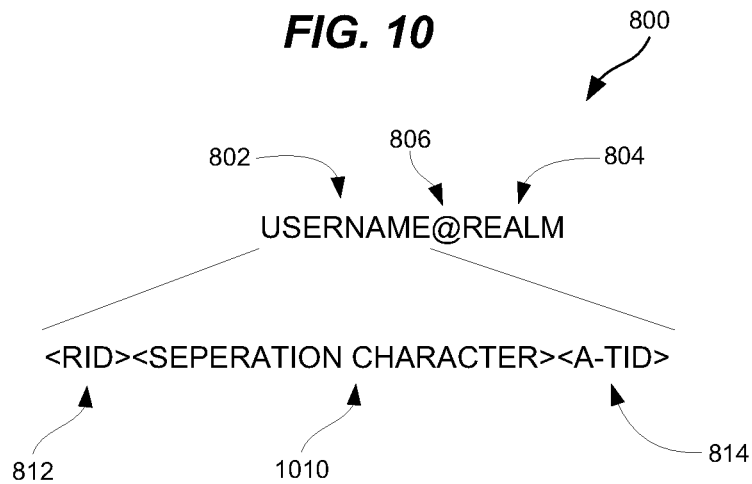
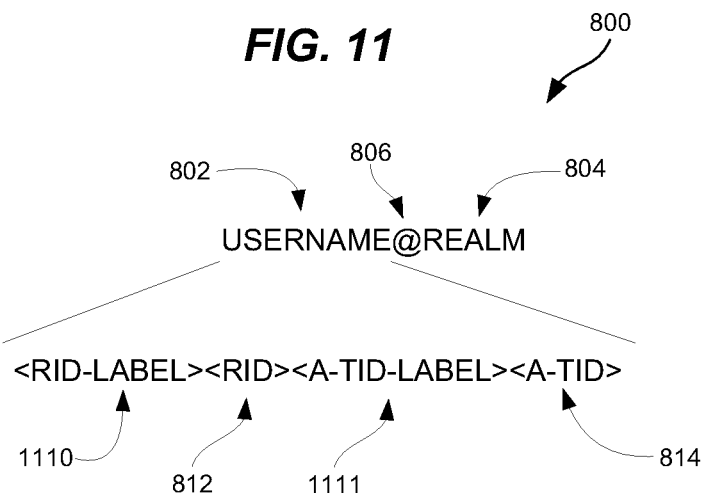

ENRICHED A-KID FOR AKMA AUTHENTICATION SERVICE

TECHNICAL FIELD

This disclosure is related to the field of communication systems and, in particular, to next generation networks.

BACKGROUND

Next generation networks, such as Fifth Generation (5G), denote the next major phase of mobile telecommunications standards beyond Fourth Generation (4G) standards.

In comparison to 4G networks, next generation networks may be enhanced in terms of radio access and network architecture. Next generation networks intend to utilize new regions of the radio spectrum for Radio Access Networks (RANs), such as centimeter and millimeter wave bands.

With mobile networks widely used across the country and the world, communications may be intercepted or suffer from other kinds of attacks. To ensure security and privacy, the 3rd Generation Partnership Project (3GPP) has set forth security mechanisms for 5G mobile networks, and the security procedures performed within the 5G mobile networks. One of the security procedures between User Equipment (UE) and a 5G mobile network is primary authentication and key agreement. Primary authentication and key agreement procedures enable mutual authentication between the UE and the network, and provide keying material that can be used between the UE and the serving network in subsequent security procedures.

Another security procedure is between UEs and application providers, and is referred to as Authentication and Key Management for Application (AKMA). AKMA is a feature that leverages an operator authentication infrastructure to secure communications Between a UE and an Application Function (AF). AKMA is described in 3GPP TS 33.535 (v17.5.0), which is incorporated by reference as if fully included herein. AKMA reuses the 5G primary authentication procedure to authenticate a UE. As part of the AKMA authentication service, a key identifier is generated, which is referred to as an AKMA Key Identifier (A-KID). The A-KID is in a format of "username@realm", and the username part of the A-KID includes a Routing Indicator (RID), and an AKMA Temporary UE Identifier (A-TID). One problem is the RID and the A-TID can be variable length, which presents a challenge for a UE to encode the RID and the A-TID in the username part, or for an AF to decode the username of the A-KID.

SUMMARY

Described herein is a solution that introduces an enriched A-KID where a username includes a RID, an A-TID, and one or more supplemental characters that distinguish the RID from the A-TID in the username For example, the supplemental character may comprise a RID length that indicates a length of the RID in the username, and the RID length may be prepended to the RID in the username. One technical benefit of the enriched A-KID is the RID and the A-TID are easily distinguishable in the username even though they are variable length. Thus, an AF (or another network function) can easily decode the RID from the username of the enriched A-KID for an AKMA authentication service.

In one embodiment, an AKMA element comprises at least one processor, and at least one memory including computer program code. The processor causes the AKMA element to handle an enriched A-KID having an identifier format with a username and a realm separated by an @-symbol. The username includes a RID, an A-TID, and at least one supplemental character that distinguishes the RID from the A-TID in the username. The processor further causes the AKMA element to perform a function of an AKMA authentication service based on the enriched A-KID.

In one embodiment, the at least one supplemental character comprises a RID length indicating a length of the RID in the username, and the RID length is prepended to the RID in the username.

In one embodiment, the at least one supplemental character comprises a separation character between the RID and the A-TID in the username.

In one embodiment, the at least one supplemental character comprises a RID label preceding the RID and an A-TID label preceding the A-TID in the username.

In one embodiment, the AKMA element comprises User Equipment (UE). The processor further causes the AKMA element to generate the enriched A-KID, and send an application session establishment request message to an AKMA Application Function (AF) that includes the enriched A-KID.

In one embodiment, the AKMA element comprises an Authentication Server Function (AUSF) of a 5G core network. The processor further causes the AUSF to generate the enriched A-KID, select an AKMA Anchor Function (AAnF), and send an AKMA request to the AAnF that includes the enriched A-KID.

In one embodiment, the AKMA element comprises an AKMA Application Function (AF) or a Network Exposure Function (NEF) of a 5G core network. The processor further causes the AKMA AF or the NEF to receive an AKMA request with the enriched A-KID, process the enriched A-KID to extract the RID from the username based on the at least one supplemental character, select an AAnF based on the RID, and send an AKMA request to the AAnF that includes the enriched A-KID.

In one embodiment, a method of performing an AKMA authentication service in an AKMA element is disclosed. The method comprises handling an enriched A-KID having an identifier format with a username and a realm separated by an @-symbol. The username includes a RID, an A-TID, and at least one supplemental character that distinguishes the RID from the A-TID in the username The method further comprises performing a function of the AKMA authentication service based on the enriched A-KID.

In one embodiment, the at least one supplemental character comprises a RID length indicating a length of the RID in the username, and the RID length is prepended to the RID in the username.

In one embodiment, the at least one supplemental character comprises a separation character between the RID and the A-TID in the username.

In one embodiment, the at least one supplemental character comprises a RID label preceding the RID and an A-TID label preceding the A-TID in the username.

In one embodiment, the AKMA element comprises a UE. Handling the enriched A-KID comprises generating the enriched A-KID. Performing a function of the AKMA authentication service based on the enriched A-KID comprises sending an application session establishment request message from the UE to an AKMA AF that includes the enriched A-KID.

In one embodiment, the AKMA element comprises an AUSF of a 5G core network. Handling the enriched A-KID comprises generating the enriched A-KID. Performing a function of the AKMA authentication service based on the enriched A-KID comprises selecting an AAnF, and sending an AKMA request to the AAnF that includes the enriched A-KID.

In one embodiment, the AKMA element comprises an AKMA AF or an NEF of a 5G core network. Handling the enriched A-KID comprises receiving an AKMA request with the enriched A-KID, and processing the enriched A-KID to extract the RID based on the at least one supplemental character. Performing a function of the AKMA authentication service based on the enriched A-KID comprises selecting an AAnF based on the RID, and sending an AKMA request to the AAnF that includes the enriched A-KID.

In one embodiment, an AKMA element comprises a means for handling an enriched A-KID having an identifier format with a username and a realm separated by an @-symbol. The username includes a RID, an A-TID, and at least one supplemental character that distinguishes the RID from the A-TID in the username. The AKMA element further comprises a means for performing a function of an AKMA authentication service based on the enriched A-KID.

Other embodiments may include computer readable media, other systems, or other methods as described below.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

FIG. 8 illustrates an enriched A-KID in an illustrative embodiment.

FIG. 9 illustrates an example format of a username for an enriched A-KID in an illustrative embodiment.

FIG. 10 illustrates another example format of a username for an enriched A-KID in an illustrative embodiment.

FIG. 11 illustrates another example format of a username for an enriched A-KID in an illustrative embodiment.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
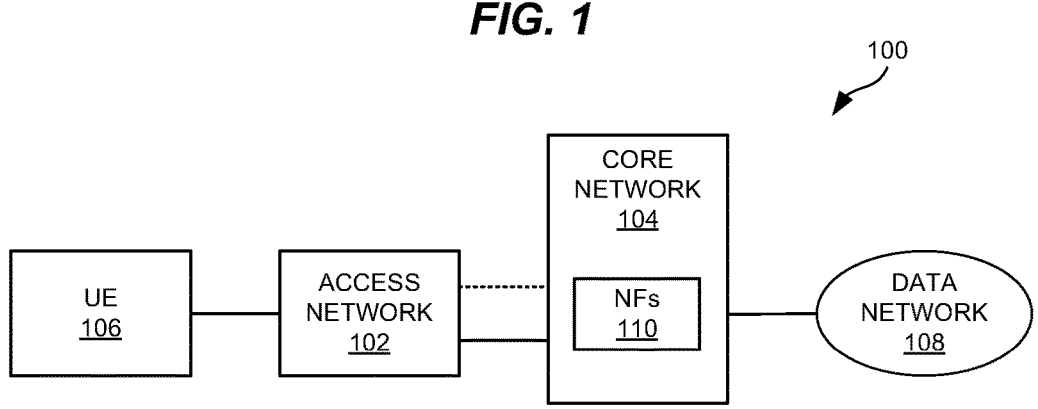
FIG. 1 illustrates a high-level architecture of a 5G system.

FIG. 1 illustrates a high-level architecture of a 5G system 100. A 5G system 100 is a communication system (e.g., a 3GPP system) comprising a 5G Access Network ((R)AN) 102, a 5G Core Network (CN) 104, and 5G User Equipment (UE) 106. Access network 102 may comprise an NG-RAN and/or a non-3GPP access network connecting to a 5G core network 104. Access network 102 may support Evolved-UMTS Terrestrial Radio Access Network (E-UTRAN) access (e.g., through an eNodeB, gNodeB, and/or ng-eNodeB), Wireless Local Area Network (WLAN) access, fixed access, satellite radio access, new Radio Access Technologies (RAT), etc. Core network 104 interconnects access network 102 with a data network (DN) 108. Core network 104 is comprised of Network Functions (NF) 110, which may be implemented either as a network element on dedicated hardware, as a software instance running on dedicated hardware, as a virtualized function instantiated on an appropriate platform (e.g., a cloud infrastructure), etc. Data network 108 may be an operator external public or private data network, or an intra-operator data network (e.g., for IMS services). UE 106 is a 5G capable device configured to register with core network 104 to access services. UE 106 may be an end user device, such as a mobile phone (e.g., smartphone), a tablet or PDA, a computer with a mobile broadband adapter, etc. UE 106 may be enabled for voice services, data services, Machine-to-Machine (M2M) or Machine Type Communications (MTC) services, and/or other services.

Figure 2:
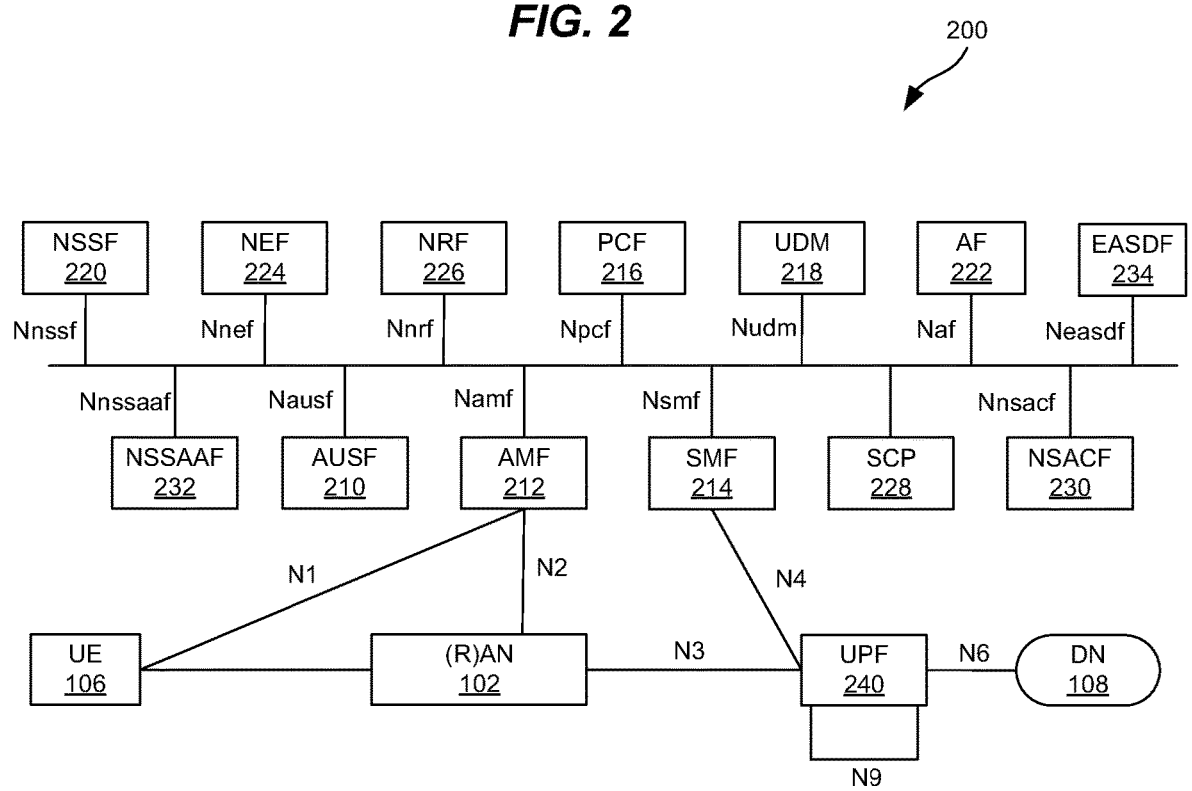
FIG. 2 illustrates a non-roaming architecture of a 5G system.

FIG. 2 illustrates a non-roaming architecture 200 of a 5G system. The architecture 200 in FIG. 2 is a service-based representation, as is further described in 3GPP TS 23.501 (v17.4.0), which is incorporated by reference as if fully included herein. Architecture 200 is comprised of Network Functions (NF) for a core network 104, and the NFs for the control plane (CP) are separated from the user plane (UP). The control plane of the core network 104 includes an Authentication Server Function (AUSF) 210, an Access and Mobility Management Function (AMF) 212, a Session Management Function (SMF) 214, a Policy Control Function (PCF) 216, a Unified Data Management (UDM) 218, a Network Slice Selection Function (NSSF) 220, and an Application Function (AF) 222. The control plane of the core network 104 further includes a Network Exposure Function (NEF) 224, a NF Repository Function (NRF) 226, a Service Communication Proxy (SCP) 228, a Network Slice Admission Control Function (NSACF) 230, a Network Slice-specific and SNPN Authentication and Authorization Function (NSSAAF) 232, and an Edge Application Server Discovery Function (EASDF) 234. The user plane of the core network 104 includes one or more User Plane Functions (UPF) 240 that communicate with data network 108. UE 106 is able to access the control plane and the user plane of the core network 104 through (R)AN 102.

There are a large number of subscribers that are able to access services from a carrier that implements a mobile network comprising a 5G system 100, such as in FIGS. 1-2. Communications between the subscribers (i.e., through a UE) and the mobile network are protected by security mechanisms, such as the ones standardized by the 3GPP. Subscribers and the carrier expect security guarantees from the security mechanisms. One of the security mechanisms is the primary authentication procedure that provides mutual authentication between the UE and the network. The following further illustrates primary authentication.

The purpose of the primary authentication and key agreement procedures is to enable mutual authentication between UE 106 and the network, and provide keying material that can be used between the UE 106 and the serving network in subsequent security procedures. The keying material generated by the primary authentication and key agreement procedure results in an anchor key called the $K_{SEAF}$ key provided by the AUSF 210 of the home network to the Security Anchor Function (SEAF) of the serving network. The SEAF provides authentication functionality via the AMF 212 in the serving network, and supports primary authentication using a Subscription Concealed Identifier (SUCI) that contains the concealed Subscription Permanent Identifier (SUPI). The SUPI is a globally unique 5G identifier allocated to each subscriber in the 5G system 100. The SUCI is composed a SUPI type, a Home Network Identifier (HN-ID) identifying the home network of the subscriber, a Routing Indicator (RID) that is assigned to the subscriber by the home network operator and provisioned in the Universal Subscriber Identity Module (USIM) of the UE, a Protection Scheme Identifier, a Home Network Public Key Identifier, and a Scheme Output. The anchor key $K_{SEAF}$ is derived from an intermediate key called the KAUSF key. The KAUSF key is established between the UE 106 and the home network resulting from the primary authentication procedure.

Figure 3:
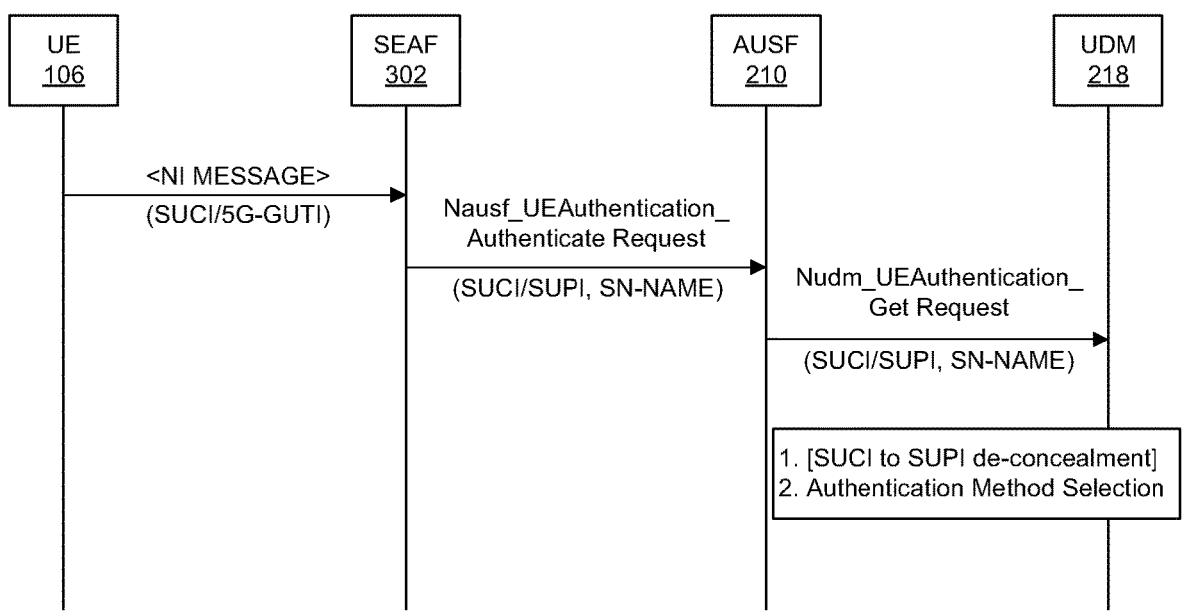
FIG. 3 is a signaling diagram that illustrates initiation of primary authentication.

FIG. 3 is a signaling diagram that illustrates initiation of primary authentication, such as described in 3GPP TS 33.501 (v17.5.0). UE 106 transmits an N1 message (i.e., an initial Non-Access Stratum (NAS) message) to the serving network (e.g., the AMF 212 of the serving network), such as a Registration Request. UE 106 uses the SUCI or a 5G Global Unique Temporary Identifier (5G-GUTI) in the Registration Request. SEAF 302 of the AMF 212 may initiate an authentication with UE 106 during any procedure establishing a signaling connection with UE 106. SEAF 302 invokes the Nausf_UEAuthentication service by sending a Nausf_UEAuthentication_Authenticate Request message to AUSF 210 to initiate an authentication. The Nausf_UEAuthentication_Authenticate Request message includes the SUCI or SUPI, and the serving network name (SN-Name). Upon receiving the Nausf_UEAuthentication_Authenticate Request message, AUSF 210 checks that the requesting SEAF 302 in the serving network is entitled to use the serving network name in the Nausf_UEAuthentication_Authenticate Request message by comparing the serving network name with the expected serving network name When the serving network is authorized to use the serving network name, AUSF 210 sends a Nudm_UEAuthentication_Get Request message to UDM 218. The Nudm_UEAuthentication_Get Request message includes the SUCI or SUPI, and the serving network name. Upon reception of the Nudm_UEAuthentication_Get Request message, UDM 218 identifies the SUPI (if received), or invokes a Subscription Identifier De-concealing Function (SIDF) that de-conceals the SUPI from the SUCI (if received). UDM 218 (or an Authentication credential Repository and Processing Function (ARPF) of UDM 218) chooses the authentication method for primary authentication based on the SUPI.

Figure 4:
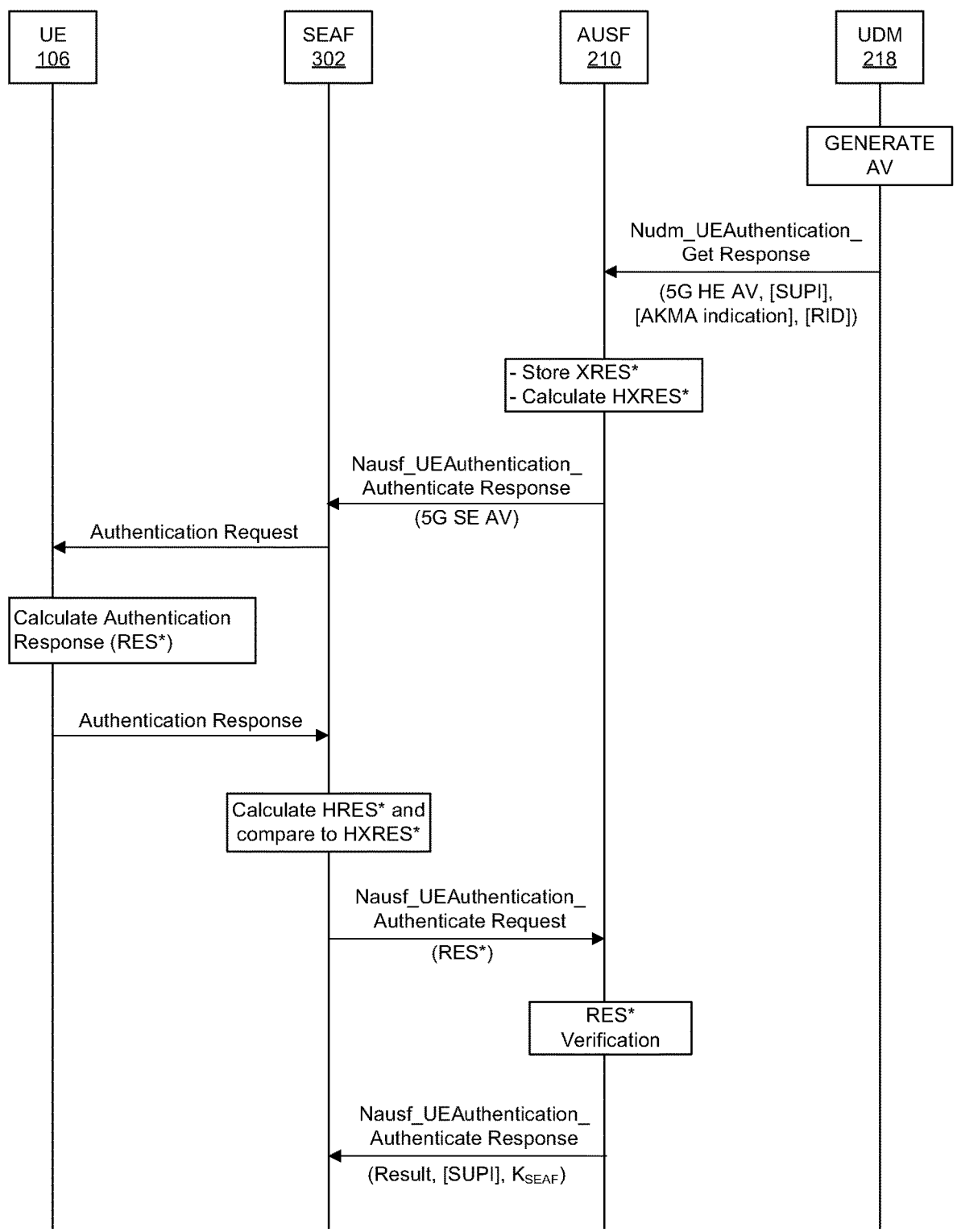
FIG. 4 is a signaling diagram that illustrates an authentication procedure.

FIG. 4 is a signaling diagram that illustrates an authentication procedure, such as described in 3GPP TS 33.501. For a Nudm_Authenticate_Get Request, UDM 218 creates a 5G Home Environment Authentication Vector (5G HE AV). UDM 218 derives the KAUSF key and calculates an expected response (XRES*) to a challenge. UDM 218 creates the 5G HE AV comprising an authentication token (AUTN), the expected response (XRES*), the KAUSF key, and a random challenge (RAND). UDM 218 then sends a Nudm_UEAuthentication_Get Response message to AUSF 210 with the 5G HE AV to be used for authentication (e.g., 5G Authentication and Key Agreement (AKA)). In case the SUCI was included in the Nudm_UEAuthentication_Get Request, UDM 218 includes the SUPI in the Nudm_UEAuthentication_Get Response message after deconcealment of the SUCI. If a subscriber has an AKMA subscription, UDM 218 includes an AKMA indication and the RID in the Nudm_UEAuthentication_Get Response message.

In response to the Nudm_UEAuthentication_Get Response message, AUSF 210 stores the expected response (XRES*) temporarily with the received SUCI or SUPI. AUSF 210 then generates a 5G Authentication Vector (5G AV) from the 5G HE AV received from UDM 218, by computing the hash expected response (HXRES*) from the expected response (XRES*) and the $K_{SEAF}$ key from the $K_{AUSF}$ key, and replacing the XRES* with the HXRES* and the $K_{AUSF}$ key with the $K_{SEAF}$ key in the 5G HE AV. AUSF 210 removes the $K_{SEAF}$ key to generate a 5G Serving Environment Authentication Vector (5G SE AV) that includes the authentication token (AUTN), hash expected response (HXRES*), and the random challenge (RAND). AUSF 210 sends a Nausf_UEAuthentication_Authenticate Response message to SEAF 302 that includes the 5G SE AV. In response, SEAF 302 sends the authentication token (AUTN) and the random challenge (RAND) to UE 106 in a NAS message Authentication Request message.

Although not shown in FIG. 4, UE 106 includes Mobile Equipment (ME) and a USIM. The ME receives the authentication token (AUTN) and the random challenge (RAND) in the NAS message Authentication Request, and forwards the authentication token (AUTN) and the random challenge (RAND) to the USIM. The USIM verifies the freshness of the received values by checking whether the authentication token (AUTN) can be accepted. If so, the USIM computes a response (RES), a cipher key (CK), and an integrity key (IK) based on the random challenge (RAND), and returns the response (RES), the CK key, and the IK key to the ME. The ME computes RES* from RES, and calculates the $K_{AUSF}$ key from CK∥IK and the $K_{SEAF}$ key from the $K_{AUSF}$ key.

UE 106 sends a NAS message Authentication Response message to SEAF 302 that includes RES*. In response, SEAF 302 computes HRES* from RES*, and compares HRES* and HXRES*. If they coincide, SEAF 302 considers the authentication successful from the serving network point of view. SEAF 302 sends RES*, as received from UE 106, in a Nausf_UEAuthentication_Authenticate Request message to AUSF 210. When AUSF 210 receives the Nausf_UEAuthentication_Authenticate Request message including a RES* as authentication confirmation, AUSF 210 stores the $K_{AUSF}$ key based on the home network operator's policy, and compares the received RES* with the stored XRES*. If the RES* and XRES* are equal, then AUSF 210 considers the authentication successful from the home network point of view. AUSF 210 informs UDM 218 about the authentication result (not shown). AUSF 210 also sends a Nausf_UEAuthentication_Authenticate Response message to SEAF 302 indicating whether or not the authentication was successful from the home network point of view. If the authentication was successful, the $K_{SEAF}$ key is sent to SEAF 302 in the Nausf_UEAuthentication_Authenticate Response message. In case AUSF 210 received the SUCI from SEAF 302 in the authentication request, AUSF 210 includes the SUPI in the Nausf_UEAuthentication_Authenticate Response message if the authentication was successful.

Figure 5:
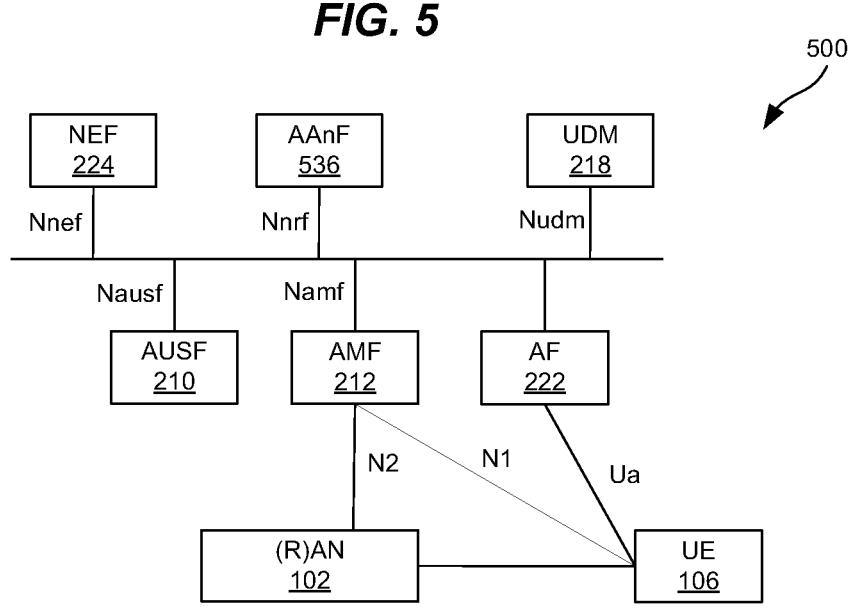
FIG. 5 illustrates a fundamental network model for AKMA.
Figure 6:
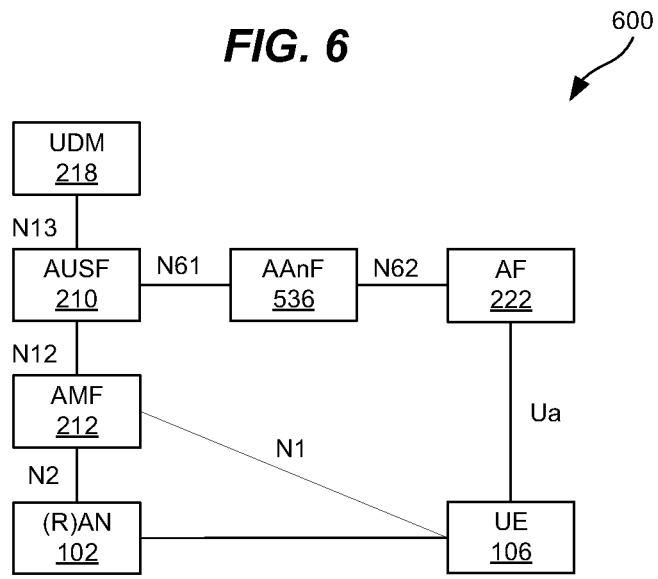
FIG. 6 illustrates an AKMA architecture in reference point representation for internal AFs.
Figure 7:
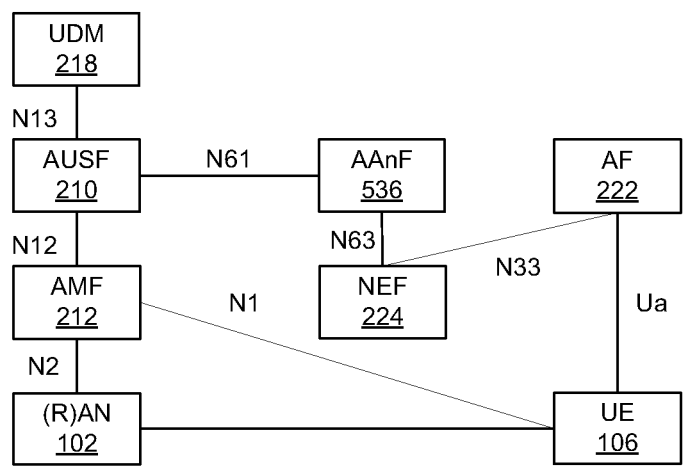
FIG. 7 illustrates an AKMA architecture in reference point representation for external AFs.

AKMA (Authentication and Key Management for Application) is a feature that leverages an operator authentication infrastructure to secure communications between a UE 106 and an AF 222. FIG. 5 illustrates a fundamental network model 500 for AKMA. FIG. 6 illustrates an AKMA architecture 600 in reference point representation for internal AFs (i.e., AFs located inside the operator's network). FIG. 7 illustrates an AKMA architecture 700 in reference point representation for external AFs (i.e., AFs located outside the operator's network).

In FIG. 5, network model 500 for AKMA includes AUSF 210, AMF 212, UDM 218, AF 222, and NEF 224. Network model 500 for AKMA also includes an AKMA Anchor Function (AAnF) 536, which is the anchor function in the Home Public Land Mobile Network (HPLMN). AAnF 536 stores the AKMA Anchor Key ($K_{AKMA}$) and the SUPI for the AKMA service, which is received from AUSF 210 after the UE 106 completes a successful 5G primary authentication. AAnF 536 also generates the key material to be used between the UE 106 and AF 222, and maintains UE AKMA contexts. AAnF 536 sends the SUPI of UE 106 to AF 222 located inside the operator's network, or to NEF 224. An AKMA AF 222 requests an AKMA Application Key, called KAE, from AAnF 536 using an AKMA Key Identifier (A-KID).

AKMA reuses the 5G primary authentication procedure to authenticate a UE 106. As an overview, a successful 5G primary authentication results in the $K_{AUSF}$ key being stored at AUSF 210 and UE 106. After UE 106 finishes primary authentication and before it initiates communication with an AF 222, UE 106 generates the $K_{AKMA}$ key and the A-KID from the $K_{AUSF}$ key. After receiving the $K_{AUSF}$ key from UDM 218, AUSF 210 stores the $K_{AUSF}$ key, and generates the $K_{AKMA}$ key and the A-KID from the $K_{AUSF}$ key. AUSF 210 sends the $K_{AKMA}$ key and the A-KID along with the SUPI of UE 106 to AAnF 536.

Conventionally, the A-KID generated by UE 106 and AUSF 210 is in a format of "username@realm". The username includes the RID and an AKMA Temporary UE Identifier (A-TID), and the realm includes the HN-ID. The RID is used with the HN-ID to route authentication traffic to UDM 218. The A-TID is derived from the $K_{AUSF}$ key with an A-TID derivation function. One problem encountered with a conventional A-KID is the RID and the A-TID are variable length. This presents a challenge for UE 106 on how to encode the RID and the A-TID in the username of the A-KID, and presents a challenge for network functions (e.g., AF 222 or NEF 224) to decode the RID and the A-TID from the username of the A-KID, such as for selecting an AAnF 536 (based on the RID).

In the embodiments described below, an enriched A-KID is defined so that the RID and the A-TID are readily distinguishable in the username FIG. 8 illustrates an enriched A-KID 800 in an illustrative embodiment. The enriched A-KID 800 has an identifier format with a username 802 and a realm 804 separated by an @-symbol 806. In this embodiment, the username 802 includes the RID 812 of a UE 106, the A-TID 814, and one or more supplemental characters 810 that distinguish the RID 812 from the A-TID 814 in the username 802. The supplemental character(s) 810 used to distinguish the RID 812 and the A-TID 814 may vary as desired.

FIG. 9 illustrates an example format of the username 802 for an enriched A-KID 800 in an illustrative embodiment. In this embodiment, the username 802 of the enriched A-KID 800 includes the RID 812 and the A-TID 814, and also includes a RID length 910 as a supplemental character 810. The RID length 910 is a value (e.g., one or more digits) indicating a length of the RID 812 in the username 802. The username 802 may therefore be constructed by concatenating the RID 812 and the A-TID 814, and prepending the RID length 910 to the RID 812. For example, assume that the RID 812 has a value of "12" and the A-TID 814 has a value of "5678". The username 802 of the enriched A-KID 800 in this example may therefore comprise "2125678", where the first digit in the username 802 indicates the length of the RID 812. In another example, assume that the RID 812 has a value of "012" and the A-TID 814 has a value of "567". The username 802 of the enriched A-KID 800 in this example may therefore comprise "3012567", where the first digit in the username 802 indicates the length of the RID 812.

FIG. 10 illustrates another example format of the username 802 for an enriched A-KID 800 in an illustrative embodiment. In this embodiment, the username 802 of the enriched A-KID 800 includes the RID 812 and the A-TID 814, and also includes a separation character 1010 (or multiple characters) between the RID 812 and the A-TID 814 as a supplemental character 810. The separation character 1010 may comprise a period ("."), a space (" "), a dash ("-"), or another character. The username 802 may therefore be constructed by inserting the RID 812, followed by the separation character 1010, followed by the A-TID 814. For example, assume that the RID 812 has a value of "12" and the A-TID 814 has a value of "5678". The username 802 of the enriched A-KID 800 in this example may therefore comprise "12.5678". In another example, assume that the RID 812 has a value of "012" and the A-TID 814 has a value of "567". The username 802 of the enriched A-KID 800 in this example may therefore comprise "012.567".

FIG. 11 illustrates another example format of the username 802 for an enriched A-KID 800 in an illustrative embodiment. In this embodiment, the username 802 of the enriched A-KID 800 includes the RID 812 and the A-TID 814, and also includes a RID label 1110 preceding the RID 812 and an A-TID label 1111 preceding the A-TID 814 as supplemental characters 810. The username 802 may further include a separation character 1010 between the RID 812 and the A-TID label 1111. The username 802 may therefore be constructed by inserting the RID label 1110, followed by the RID 812, followed by the A-TID label 1111, followed by the A-TID 814. For example, assume that the RID 812 has a value of "12" and the A-TID 814 has a value of "5678". The username 802 of the enriched A-KID 800 in this example may therefore comprise "rid12atid5678". In another example, assume that the RID 812 has a value of "012" and the A-TID 814 has a value of "567". The username 802 of the enriched A-KID 800 in this example may therefore comprise "rid012atid567".

In the examples of FIGS. 9-11, the RID 812 was described as preceding the A-TID 814 in the username 802. However, the RID 812 and the A-TID 814 may be transposed in other embodiments so that the A-TID 814 precedes the RID 812 in the username 802. Similar concepts apply as described above in this scenario.

One technical benefit of the enriched A-KID 800 is the RID 812 and the A-TID 814 are easily distinguishable in the username 802 even though they are variable length. Thus, network functions (e.g., AF 222 or NEF 224) can easily decode the RID 812 and the A-TID 814 from the username 802 of the enriched A-KID 800, such as for selecting an AAnF 536.

Figure 12:
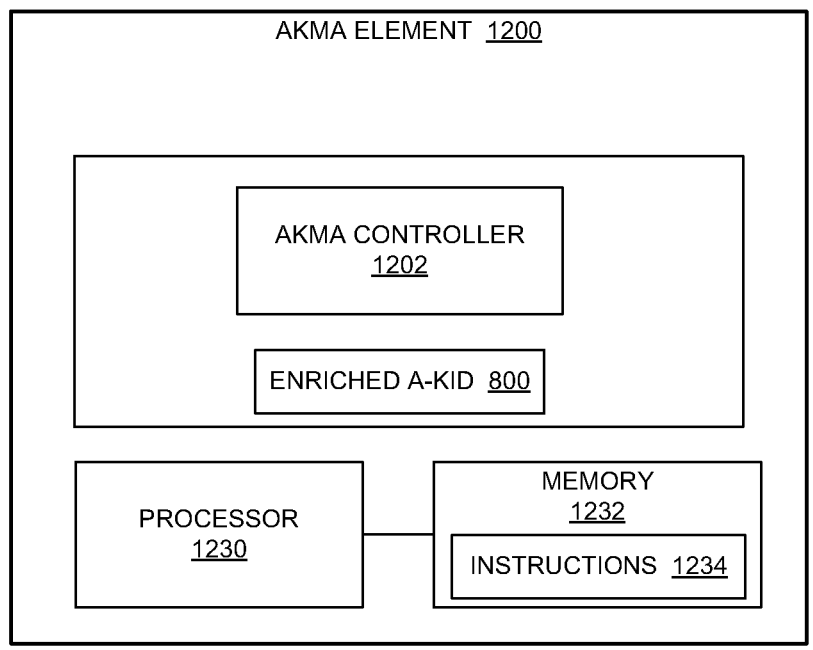
FIG. 12 is a block diagram of an AKMA element in an illustrative embodiment.

The enriched A-KID 800 may therefore be used in the AKMA authentication service. FIG. 12 is a block diagram of an AKMA element 1200 in an illustrative embodiment. AKMA element 1200 is a processing element that is enabled for the AKMA authentication service. For example, AKMA element 1200 may comprise a UE 106, a network element or network function (NF), such as a AUSF 210, AF 222, NEF 224, AAnF 536, etc., or another type of device. AKMA element 1200 includes an AKMA controller 1202, which comprises circuitry, logic, hardware, means, etc., configured to support operations, procedures, or functions for an AKMA authentication service. One or more of the subsystems of AKMA element 1200 may be implemented on a hardware platform comprised of analog and/or digital circuitry. AKMA controller 1202 may be implemented on one or more processors 1230 that execute instructions 1234 (i.e., computer readable code) for software that are loaded into memory 1232. A processor 1230 comprises an integrated hardware circuit configured to execute instructions 1234 to provide the functions of AKMA element 1200. Processor 1230 may comprise a set of one or more processors or may comprise a multi-processor core, depending on the particular implementation. Memory 1232 is a non-transitory computer readable storage medium for data, instructions, applications, etc., and is accessible by processor 1230. Memory 1232 is a hardware storage device capable of storing information on a temporary basis and/or a permanent basis. Memory 1232 may comprise a random-access memory, or any other volatile or non-volatile storage device.

Figure 13:
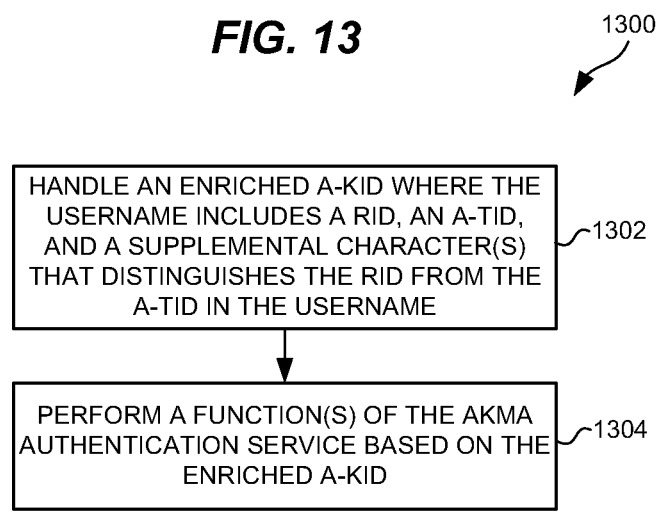
FIG. 13 is a flow chart illustrating a method of performing an AKMA authentication service in an illustrative embodiment.

FIG. 13 is a flow chart illustrating a method 1300 of performing an AKMA authentication service in an illustrative embodiment. The steps of method 1300 will be described with reference to AKMA element 1200 in FIG. 12, but those skilled in the art will appreciate that method 1300 may be performed in other systems, devices, or network functions. The steps of the flow charts described herein are not all inclusive and may include other steps not shown, and the steps may be performed in an alternative order.

AKMA controller 1202 handles an enriched A-KID 800 as described above where the username 802 includes a RID 812, an A-TID 814, and one or more supplemental characters 810 that distinguish the RID 812 from the A-TID 814 in the username 802 (step 1302). For example, AKMA controller 1202 may derive or generate an enriched A-KID 800 having a username 802 that includes the RID 812, A-TID 814, and a supplemental character(s) 810. In another example, AKMA controller 1202 may receive an enriched A-KID 800 having a username 802 that includes the RID 812, A-TID 814, and a supplemental character(s) 810, and decode or extract the RID 812 from the username 802 of the enriched A-KID 800 based on the supplemental character(s) 810.

AKMA controller 1202 may then perform one or more functions of the AKMA authentication service based on the enriched A-KID 800 (step 1304). For example, AKMA controller 1202 may send an AKMA request to another element that includes the enriched A-KID 800. In another example, AKMA controller 1202 may select an AAnF 536 based on the RID 812 extracted from the username 802 of the enriched A-KID 800.

Figure 14:
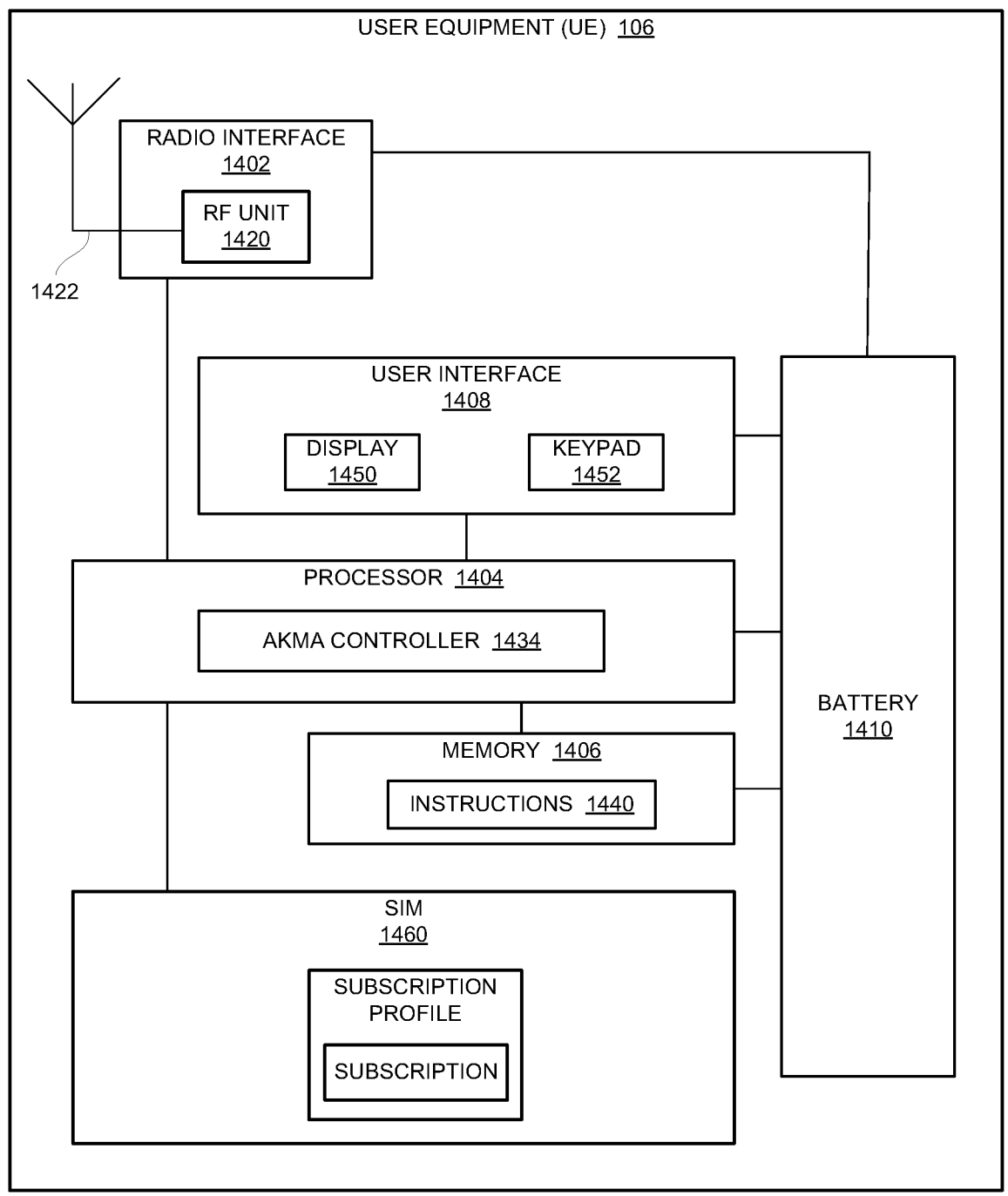
FIG. 14 is a block diagram of a UE in an illustrative embodiment.

One example of AKMA element 1200 is a UE 106. FIG. 14 is a block diagram of a UE 106 in an illustrative embodiment. UE 106 includes a radio interface component 1402, one or more processors 1404, a memory 1406, a user interface component 1408, and a battery 1410. Radio interface component 1402 is a hardware component that represents the local radio resources of UE 106, such as an RF unit 1420 (e.g., one or more radio transceivers) and one or more antennas 1422. Radio interface component 1402 may be configured for WiFi, Bluetooth, 5G New Radio (NR), Long-Term Evolution (LTE), etc. Processor 1404 represents the internal circuitry, logic, hardware, etc., that provides the functions of UE 106. Processor 1404 may be configured to execute instructions 1440 (i.e., computer program code) for software that are loaded into memory 1406. Processor 1404 may comprise a set of one or more processors or may comprise a multi-processor core, depending on the particular implementation. Memory 1406 is a computer readable storage medium for data, instructions 1440, applications, etc., and is accessible by processor 1404. Memory 1406 is a hardware storage device capable of storing information on a temporary basis and/or a permanent basis. Memory 1406 may comprise a random-access memory, or any other volatile or non-volatile storage device. User interface component 1408 is a hardware component for interacting with an end user. For example, user interface component 1408 may include a display 1450, screen, touch screen, or the like (e.g., a Liquid Crystal Display (LCD), a Light Emitting Diode (LED) display, etc.). User interface component 1408 may include a keyboard or keypad 1452, a tracking device (e.g., a trackball or trackpad), a speaker, a microphone, etc. UE 106 may include various other components not specifically illustrated in FIG. 14.

UE 106 also includes a Subscriber Identity Module (SIM) 1460, which is an integrated circuit that provides security and integrity functions for UE 106 (e.g., SIM card, Universal SIM (USIM), etc.). SIM 1460 includes or is provisioned with one or more subscription profiles for UE 106. A subscription profile has an associated subscription, subscription parameters, subscription credentials, etc. Subscription credentials are a set of values that includes a public key of its home network, a long-term secret key (K), and a subscription identifier (e.g., SUPI) used to uniquely identify a subscription and to mutually authenticate the UE 106 and a network.

Processor 1404 may implement an AKMA controller 1434 in this embodiment. AKMA controller 1434 is configured to support operations, procedures, or functions of an AKMA authentication service.

Figure 15:
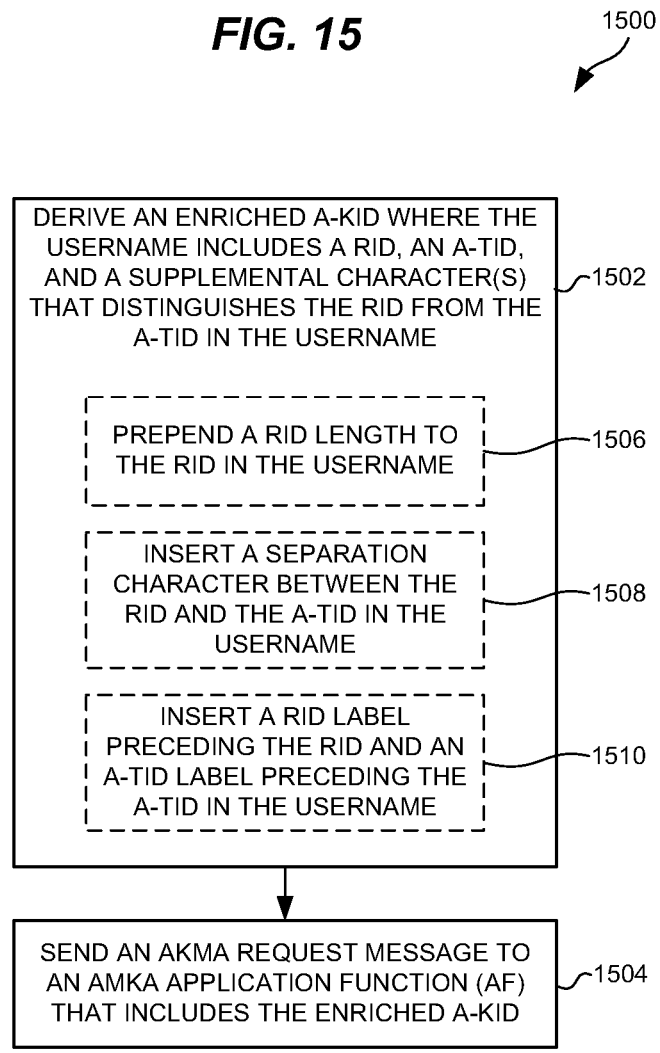
FIG. 15 is a flow chart illustrating another method of performing an AKMA authentication service in an illustrative embodiment.

FIG. 15 is a flow chart illustrating another method 1500 of performing an AKMA authentication service in an illustrative embodiment. The steps of method 1500 will be described with reference to UE 106 in FIG. 14, but those skilled in the art will appreciate that method 1500 may be performed in other systems, devices, or network functions.

During primary authentication, a UE 106 generates an $K_{AKMA}$ key and a A-KID from the $K_{AUSF}$ key before initiating communication with an AKMA AF 222. In this embodiment, the AKMA controller 1434 of UE 106 derives or generates an enriched A-KID 800 where the username 802 includes a RID 812, an A-TID 814, and one or more supplemental characters 810 that distinguish the RID 812 from the A-TID 814 in the username 802 (step 1502). In one example, the supplemental character 810 may comprise a RID length 910. AKMA controller 1434 may concatenate the RID 812 and the A-TID 814, and prepend the RID length 910 to the RID 812 in the username 802 (optional step 1506). Thus, AKMA controller 1434 may insert the RID length 910 as the first digit (or digits) of the username 802, followed by the RID 812, followed by the A-TID 814. In another example, the supplemental character 810 may comprise a separation character 1010. AKMA controller 1434 may concatenate the RID 812 and the A-TID 814, and insert the separation character 1010 between the RID 812 and the A-TID 814 in the username 802 (optional step 1508). Thus, AKMA controller 1434 may insert the RID 812, followed by a separation character 1010, followed by the A-TID 814 in the username 802. In another example, the supplemental characters 810 may comprise labels for the RID 812 and the A-TID 814. AKMA controller 1434 may insert a RID label 1110 preceding the RID 812 and an A-TID label 1111 preceding the A-TID 814 in the username 802 (optional step 1510). Thus, AKMA controller 1434 may insert the RID label 1110, followed by the RID 812, followed by the A-TID label 1111, followed by the A-TID 814 in the username 802.

AKMA controller 1434 then sends an AKMA request (e.g., an application session establishment request message) to an AKMA AF 222 that includes the enriched A-KID 800 (step 1504).

Figure 16:
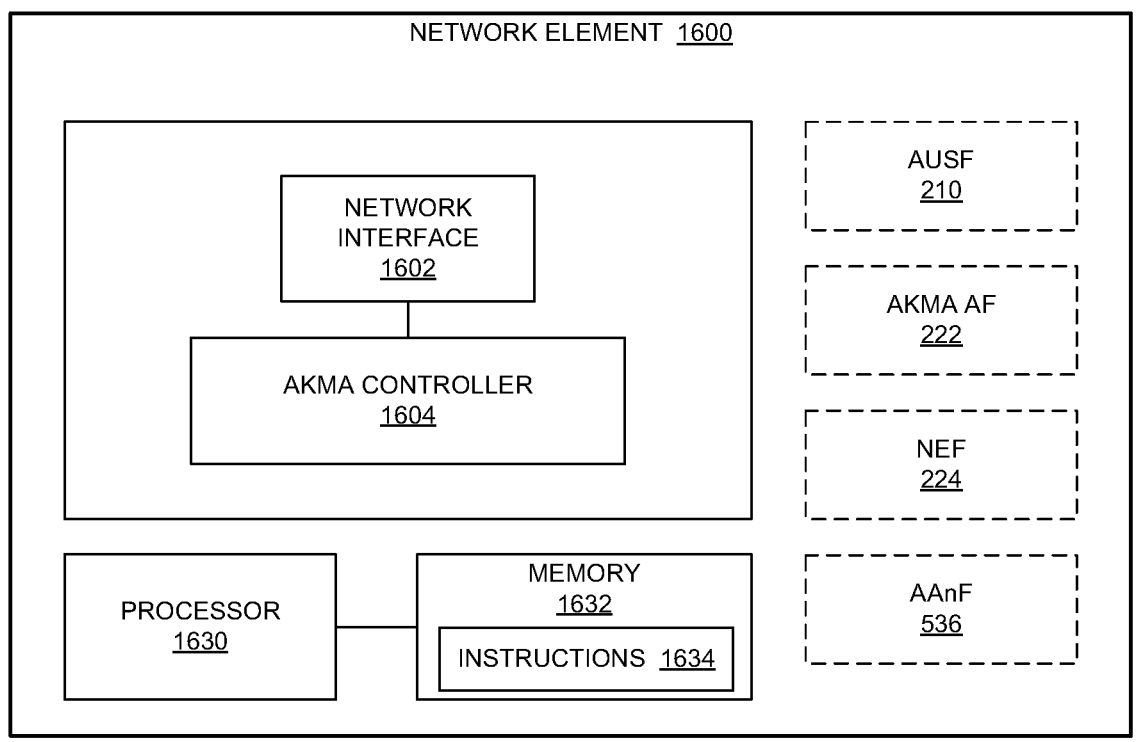
FIG. 16 is a block diagram of a network element in an illustrative embodiment.

Another example of AKMA element 1200 is a network element of the 5G core network 104. FIG. 16 is a block diagram of a network element 1600 in an illustrative embodiment. Network element 1600 comprises a server, device, apparatus, equipment (including hardware), system, etc., that implements one or more network functions (NF) 110 of a 5G core network 104. In this embodiment, network element 1600 includes the following subsystems: a network interface component 1602, and an AKMA controller 1604 that operate on one or more platforms. Network interface component 1602 may comprise circuitry, logic, hardware, means, etc., configured to exchange control plane messages or signaling with other network elements and/or UEs. Network interface component 1602 may operate using a variety of protocols (including NAS protocol) or reference points. AKMA controller 1604 may comprise circuitry, logic, hardware, means, etc., configured to support operations, procedures, or functions of an AKMA authentication service.

As illustrated in FIG. 16, network element 1600 may represent an AUSF 210 of a 5G core network 104. Network element 1600 may additionally or alternatively represent an AKMA AF 222, an NEF 224, or an AAnF 536.

One or more of the subsystems of network element 1600 may be implemented on a hardware platform comprised of analog and/or digital circuitry. One or more of the subsystems of network element 1600 may be implemented on one or more processors 1630 that execute instructions 1634 (i.e., computer readable code) for software that are loaded into memory 1632. A processor 1630 comprises an integrated hardware circuit configured to execute instructions 1634 to provide the functions of network element 1600. Processor 1630 may comprise a set of one or more processors or may comprise a multi-processor core, depending on the particular implementation. Memory 1632 is a non-transitory computer readable storage medium for data, instructions, applications, etc., and is accessible by processor 1630. Memory 1632 is a hardware storage device capable of storing information on a temporary basis and/or a permanent basis. Memory 1632 may comprise a random-access memory, or any other volatile or non-volatile storage device.

Network element 1600 may include various other components not specifically illustrated in FIG. 16.

Figure 17:
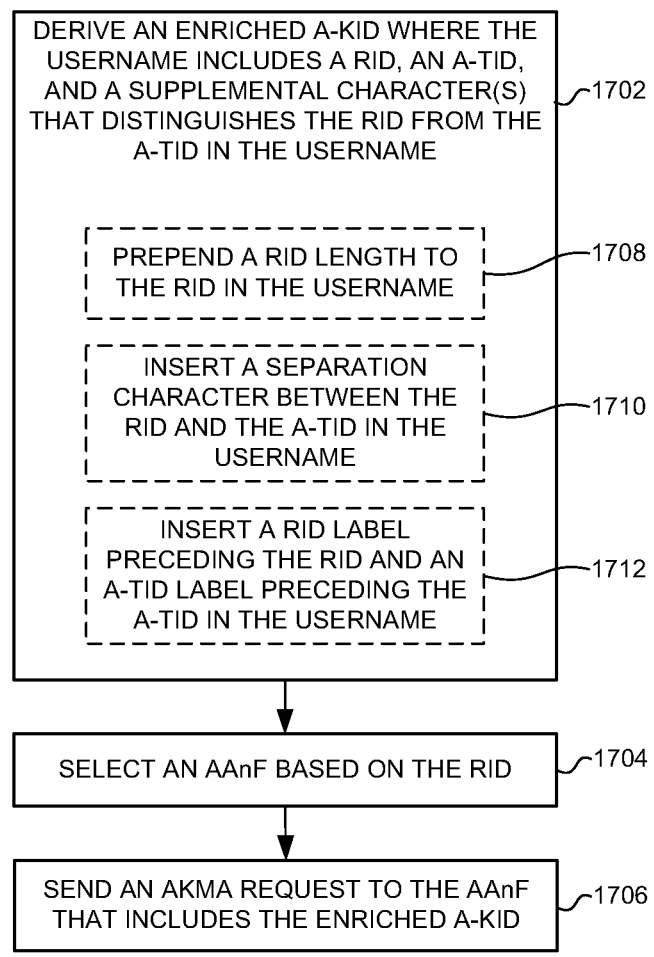
FIG. 17 is a flow chart illustrating another method of performing an AKMA authentication service in an illustrative embodiment.

FIG. 17 is a flow chart illustrating another method 1700 of performing an AKMA authentication service in an illustrative embodiment. The steps of method 1700 will be described with reference to network element 1600 in FIG. 16, but those skilled in the art will appreciate that method 1700 may be performed in other systems, devices, or network functions.

In this embodiment, network element 1600 comprises a AUSF 210. If AUSF 210 receives an AKMA indication from UDM 218 during primary authentication, then AUSF 210 generates the $K_{AKMA}$ key and an A-KID from the $K_{AUSF}$ key after the primary authentication procedure is successfully completed. In this embodiment, the AKMA controller 1604 of the AUSF 210 derives or generates an enriched A-KID 800 where the username 802 includes a RID 812, an A-TID 814, and one or more supplemental characters 810 that distinguish the RID 812 from the A-TID 814 in the username 802 (step 1702). In one example, the supplemental character 810 may comprise a RID length 910. AKMA controller 1604 may concatenate the RID 812 and the A-TID 814, and prepend the RID length 910 to the RID 812 in the username 802 (optional step 1708). Thus, AKMA controller 1604 may insert the RID length 910 as the first digit (or digits) of the username 802, followed by the RID 812, followed by the A-TID 814. In another example, the supplemental character 810 may comprise a separation character 1010. AKMA controller 1604 may concatenate the RID 812 and the A-TID 814, and insert the separation character 1010 between the RID 812 and the A-TID 814 in the username 802 (optional step 1710). Thus, AKMA controller 1604 may insert the RID 812, followed by a separation character 1010, followed by the A-TID 814 in the username 802. In another example, the supplemental characters 810 may comprise labels for the RID 812 and the A-TID 814. AKMA controller 1604 may insert a RID label 1110 preceding the RID 812 and an A-TID label 1111 preceding the A-TID 814 in the username 802 (optional step 1712). Thus, AKMA controller 1604 may insert the RID label 1110, followed by the RID 812, followed by the A-TID label 1111, followed by the A-TID 814 in the username 802.

AKMA controller 1604 then selects an AAnF 536 based on the RID 812 (step 1704), and sends an AKMA request (e.g., an Naanf_AKMA_AnchorKey_Register Request) to the AAnF 536 including the enriched A-KID 800 (step 1706). AKMA controller 1604 may include additional information in the AKMA request to the AAnF 536, such as the $K_{AKMA}$ key, the SUPI of UE 106, etc.

Figure 18:
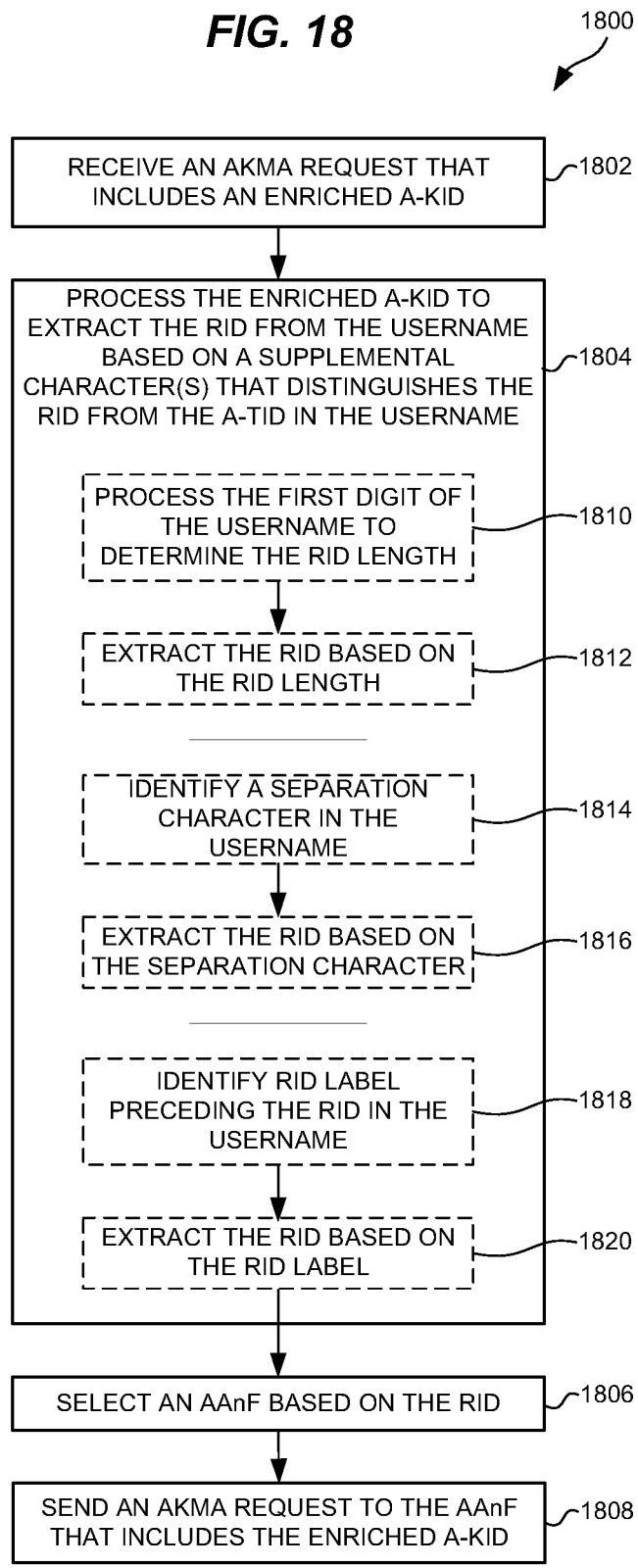
FIG. 18 is a flow chart illustrating another method of performing an AKMA authentication service in an illustrative embodiment.

FIG. 18 is a flow chart illustrating another method 1800 of performing an AKMA authentication service in an illustrative embodiment. The steps of method 1800 will be described with reference to network element 1600 in FIG. 16, but those skilled in the art will appreciate that method 1800 may be performed in other systems, devices, or network functions.

In this embodiment, network element 1600 comprises an AF 222 or NEF 224. An AF 222 or NEF 224 is configured to discover an AAnF 536 in response to an AKMA request. When an AF 222 is located in the operator's network, the AF 222 discovers the AAnF 536 based on an A-KID received in the AKMA request. When an AF 222 is located outside of the operator's network, an NEF 224 in the operator's network discovers the AAnF 536 based on an A-KID received in the AKMA request.

AKMA controller 1604 receives an AKMA request with an enriched A-KID 800 (step 1802). AKMA controller 1604 processes, decodes, or deciphers the enriched A-KID 800 to extract the RID 812 from the username 802 based on the supplemental character(s) 810 (step 1804). In one example, the supplemental character 810 may comprise a RID length 910 prepended to the username 802. Thus, AKMA controller 1604 may process the first digit of the username 802 to determine the RID length 910 (optional step 1810), and extract the RID 812 from the username 802 based on the RID length 910 (optional step 1812). In another example, the supplemental character 810 may comprise a separation character 1010 between the RID 812 and the A-TID 814 in the username 802. Thus, AKMA controller 1604 may identify the separation character 1010 in the username 802 (optional step 1814), and extract the RID 812 preceding (or following) the separation character 1010 from the username 802 (optional step 1816). In another example, the supplemental characters 810 may comprise labels for the RID 812 and the A-TID 814. Thus, AKMA controller 1604 may identify the RID label 1110 preceding the RID 812 in the username 802 (optional step 1818), and extract the RID 812 from the username 802 based on the RID label 1110 (optional step 1820).

AKMA controller 1604 then selects an AAnF 536 based on the RID 812 (step 1806) that was extracted from the enriched A-KID 800. After selection of an AAnF 536, AKMA controller 1604 sends an AKMA request to the AAnF 536 with the enriched A-KID 800 (step 1808), such as to obtain the AKMA Application Key $K_{AF}$. For example, an AKMA AF 222 may send an Naanf_AKMA_ApplicationKey_Get request message to AAnF 536 that includes the enriched A-KID 800. In another example, an NEF 224 may send an Naanf_AKMA_AFKey_request message to AAnF 536 that includes the enriched A-KID 800. In response to receiving the AKMA request, AAnF 536 stores the enriched A-KID 800.

Figure 19:
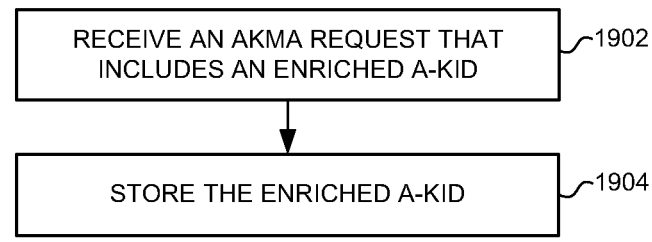
FIG. 19 is a flow chart illustrating another method of performing an AKMA authentication service in an illustrative embodiment.

FIG. 19 is a flow chart illustrating another method 1900 of performing an AKMA authentication service in an illustrative embodiment. The steps of method 1900 will be described with reference to network element 1600 in FIG. 16, but those skilled in the art will appreciate that method 1900 may be performed in other systems, devices, or network functions.

In this embodiment, network element 1600 comprises an AAnF 536. AKMA controller 1604 receives an AKMA request with an enriched A-KID 800 (step 1902). For example, an AAnF 536 may receive an Naanf_AKMA_AnchorKey_Register Request message from an AUSF 210 that includes the enriched A-KID 800. In another example, an AAnF 536 may receive an Naanf_AKMA_ApplicationKey_Get request message from an AKMA AF 222 that includes the enriched A-KID 800. In yet another example, an AAnF 536 may receive an Naanf_AKMA_AFKey_request message from an NEF 224 that includes the enriched A-KID 800. AKMA controller 1604 then stores the enriched A-KID 800 (step 1904).

Figure 20:
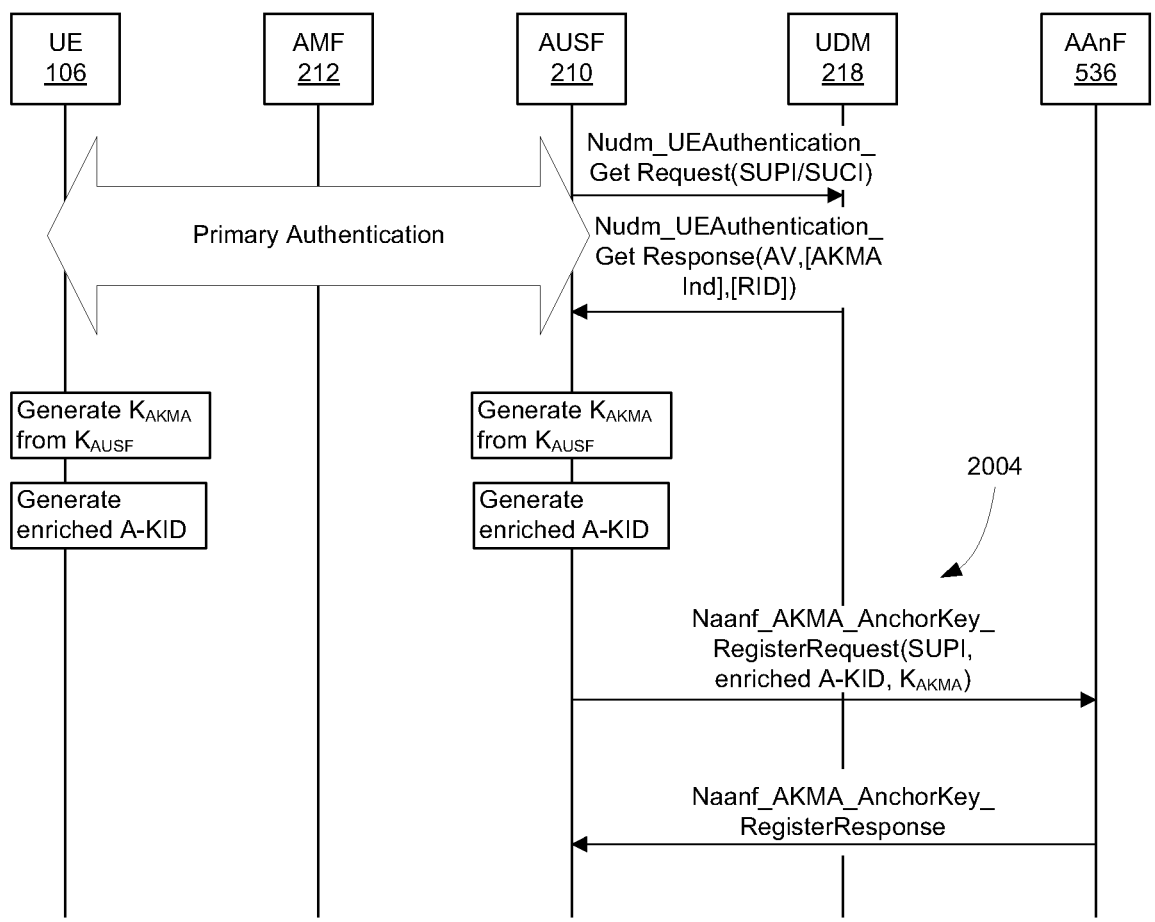
FIG. 20 is a signaling diagram that illustrates generating of an AKMA Anchor Key ($K_{AKMA}$) after primary authentication in an illustrative embodiment.

Further details of an AKMA authentication service are described below using the enriched A-KID 800. FIG. 20 is a signaling diagram that illustrates generating of the AKMA Anchor Key ($K_{AKMA}$) after primary authentication in an illustrative embodiment. During the primary authentication procedure, AUSF 210 interacts with UDM 218 in order to fetch authentication information, such as subscription credentials (e.g., AKA Authentication vectors) and the authentication method using the Nudm_UEAuthentication_Get Request service operation. In the response, UDM 218 may also provide an AKMA indication to AUSF 210 whether the $K_{AKMA}$ key needs to be generated for UE 106. If the AKMA indication is included, UDM 218 also includes the RID of UE 106 in the Nudm_UEAuthentication_Get Request.

If AUSF 210 receives the AKMA indication from UDM 218, AUSF 210 stores the $K_{AUSF}$ key, and generates the $K_{AKMA}$ key and the enhanced A-KID 800 from the $K_{AUSF}$ key after the primary authentication procedure is successfully completed. Likewise, UE 106 generates the $K_{AKMA}$ key and the enhanced A-KID 800 from the $K_{AUSF}$ key before initiating communication with an AKMA AF 222. After the AKMA key material is generated, AUSF 210 selects the AAnF 536 and sends the enhanced A-KID 800 and the $K_{AKMA}$ key to AAnF 536 along with the SUPI of UE 106 using an Naanf_AKMA_AnchorKey_Register Request message 2004. AAnF 536 sends a response to AUSF 210 using an Naanf_AKMA_AnchorKey_Register Response message.

Figure 21:
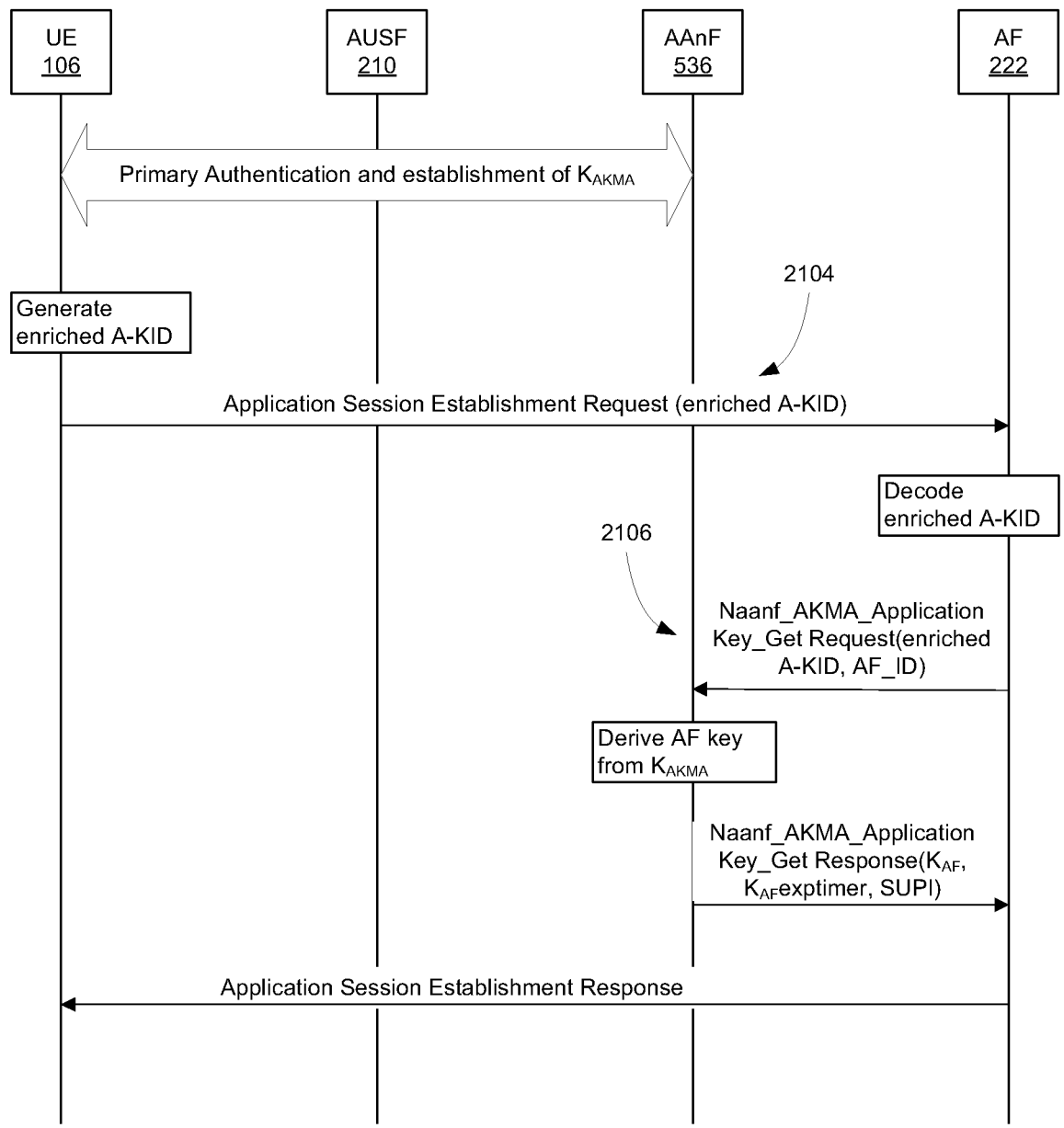
FIG. 21 is a signaling diagram that illustrates generating of the AKMA Application Key ($K_{AF}$) in an illustrative embodiment.

FIG. 21 is a signaling diagram that illustrates generating of the AKMA Application Key ($K_{AF}$) in an illustrative embodiment. Before communication between UE 106 and the AKMA AF 222 can start, UE 106 and the AKMA AF 222 need to know whether to use AKMA. This knowledge is implicit to the specific application on UE 106 and AKMA AF 222 or indicated by the AKMA AF 222 to UE 106. UE 106 generates the AKMA Anchor Key ($K_{AKMA}$) and the enriched A-KID 800 from the $K_{AUSF}$ before initiating communication with an AKMA AF 222. When UE 106 initiates communication with the AKMA AF 222, UE 106 includes the enriched A-KID 800 in an AKMA request to the AKMA AF 222 (e.g., the Application Session Establishment Request message 2104). UE 106 may derive the $K_{AF}$ key before sending the message or afterwards.

If the AKMA AF 222 does not have an active context associated with the enriched A-KID 800, then the AKMA AF 222 decodes the enriched A-KID 800 to extract the RID 812 from the username 802 of the enriched A-KID 800 based on the supplemental character 810, and selects an AAnF 536 based on the RID 812. The AKMA AF 222 then sends a Naanf_AKMA_ApplicationKey_Get request 2106 to AAnF 536 with the enriched A-KID 800 to request the $K_{AF}$ key for UE 106. AKMA AF 222 also includes its identity (AF_ID) in the request.

AAnF 536 checks whether it can provide the service to the AKMA AF 222 based on the configured local policy or based on the authorization information or policy provided by NRF 226 using the AF_ID. If it succeeds, AAnF 536 verifies whether the subscriber is authorized to use AKMA based on the presence of the UE-specific $K_{AKMA}$ key identified by the enriched A-KID 800. AAnF 536 derives the $K_{AF}$ key from the $K_{AKMA}$ key if it does not already have the $K_{AF}$ key, and sends an Naanf_AKMA_ApplicationKey_Get response to AKMA AF 222 with the SUPI, the $K_{AF}$ key, and a $K_{AF}$ expiration time. AKMA AF 222 sends an AKMA response (e.g., the Application Session Establishment Response) to UE 106.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

As used in this application, the term "circuitry" may refer to one or more or all of the following:
(a) hardware-only circuit implementations (such as implementations in only analog and/or digital circuitry);
(b) combinations of hardware circuits and software, such as (as applicable):
  (i) a combination of analog and/or digital hardware circuit(s) with software/firmware; and
  (ii) any portions of hardware processor(s) with software (including digital signal processor(s)), software, and memory(ies) that work together to cause an apparatus, such as a mobile phone or server, to perform various functions); and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although specific embodiments were described herein, the scope of the disclosure is not limited to those specific embodiments. The scope of the disclosure is defined by the following claims and any equivalents thereof.

What is claimed is:

1. A user equipment comprising:
at least one processor; and
at least one memory storing instructions, that when executed by the at least one processor, cause the user equipment at least to perform:
  generating, after primary authentication with a network and before initiating communication with an application function, an Authentication and Key Management for Applications (AKMA) key and an enriched AKMA Key Identifier (A-KID) having an identifier format of a username and a realm separated by an @-symbol based on a KAUSF key; and
  sending an application session establishment request to the application function comprising the enriched A-KID, wherein
  the generating the enriched A-KID having the identifier format of the username and the realm separated by the @-symbol based on the KAUSF key comprises:
    constructing the username by inserting a Routing Indicator (RID) and an AKMA Temporary User Equipment (UE) Identifier (A-TID) in the username, inserting a RID label preceding the RID in the username, and inserting an A-TID label preceding the A-TID in the username.

2. The user equipment of claim 1 wherein:
the constructing the username comprises inserting the RID label, followed by the RID, followed by the A-TID label, followed by the A-TID in the username.

3. The user equipment of claim 2 wherein:
the constructing the username further includes inserting a separation character between the RID and the A-TID label.

4. A method comprising:
generating, at a user equipment after primary authentication with a network and before initiating communication with an application function, an Authentication and Key Management for Applications (AKMA) key and an enriched AKMA Key Identifier (A-KID) having an identifier format of a username and a realm separated by an @-symbol based on a KAUSF key; and
sending, at the user equipment, an application session establishment request to the application function comprising the enriched A-KID, wherein
the generating the enriched A-KID having the identifier format of the username and the realm separated by the @-symbol based on the KAUSF key comprises:
  constructing the username by inserting a Routing Indicator (RID) and an AKMA Temporary User Equipment (UE) Identifier (A-TID) in the username, inserting a RID label preceding the RID in the username, and inserting an A-TID label preceding the A-TID in the username.

5. The method of claim 4, wherein:
the constructing the username comprises inserting the RID label, followed by the RID, followed by the A-TID label, followed by the A-TID in the username.

6. The method of claim 5, wherein:
the constructing the username further includes inserting a separation character between the RID and the A-TID label.

7. A non-transitory computer readable medium comprising instructions for causing an apparatus comprising a user equipment to perform at least the following:

generating, at the user equipment after primary authentication with a network and before initiating communication with an application function, an Authentication and Key Management for Applications (AKMA) key and an enriched AKMA Key Identifier (A-KID) having an identifier format of a username and a realm separated by an @-symbol based on a KAUSF key; and sending, at the user equipment, an application session establishment request to the application function comprising the enriched A-KID, wherein the generating the enriched A-KID having the identifier format of the username and the realm separated by the @-symbol based on the KAUSF key comprises:

constructing the username by inserting a Routing Indicator (RID) and an AKMA Temporary User Equipment (UE) Identifier (A-TID) in the username, inserting a RID label preceding the RID in the username, and inserting an A-TID label preceding the A-TID in the username.

8. The computer readable medium of claim 7, wherein:
the constructing the username comprises inserting the RID label, followed by the RID, followed by the A-TID label, followed by the A-TID in the username.

9. The computer readable medium of claim 8, wherein:
the constructing the username further includes inserting a separation character between the RID and the A-TID label.

* * * * *